United States Patent [19]

Miller

[11] Patent Number: 5,017,760
[45] Date of Patent: May 21, 1991

[54] PLASTIC PIPE HEATER

[75] Inventor: Lee A. Miller, Novelty, Ohio

[73] Assignee: GB Electrical, Inc., Milwaukee, Wis.

[21] Appl. No.: 387,139

[22] Filed: Jul. 31, 1989

[51] Int. Cl.⁵ .................... F27D 11/02; F27B 5/14
[52] U.S. Cl. ................................ 219/390; 219/521; 219/387
[58] Field of Search .............. 219/390, 346, 406, 533, 219/387, 521

[56] References Cited

U.S. PATENT DOCUMENTS

| Re. 24,738 | 11/1959 | Kueser | 219/406 |
|---|---|---|---|
| 1,129,842 | 3/1915 | Blatchford | 219/533 |
| 1,184,236 | 5/1916 | Hawkes | 219/390 |
| 1,263,598 | 4/1918 | Pfanstiehl | 219/390 |
| 1,679,424 | 8/1928 | Hopp | 219/533 |
| 1,687,858 | 10/1928 | Curtis | 219/533 |
| 1,806,942 | 5/1931 | Hendricks | 219/535 |
| 1,930,836 | 10/1933 | D'Amico | 219/390 |
| 2,145,324 | 1/1939 | Stauss | 219/390 |
| 2,760,045 | 8/1956 | Blue | 219/533 |
| 2,823,292 | 2/1958 | Kunzle | 219/407 |
| 2,828,402 | 3/1958 | Paolicelli | 219/406 |

FOREIGN PATENT DOCUMENTS

| 429386 | 12/1924 | Fed. Rep. of Germany | 219/406 |
|---|---|---|---|
| 522081 | 1/1928 | Fed. Rep. of Germany | 219/407 |
| 1232713 | 1/1967 | Fed. Rep. of Germany | 219/390 |

Primary Examiner—Teresa J. Walberg

[57] ABSTRACT

A plastic conduit heater for use in the field bending of plastic conduit charaterized by a heat sink pipe segment open at both ends with a resistance heating element wrapped around the exterior of the pipe segment and in intimate contact with the exterior of the pipe segment. The element may be prefabricated and is wrapped in spiral turns which may be more closely spaced toward the ends of the pipe so that the pipe segment is heated uniformly throughout its length. The heating element is encased in insulation which is in turn enclosed in a tubular housing. The housing includes a centrally located handle and an adjustable thermostat for varying the temperature depending on field conditions. One or more plastic conduits or pipes may be positioned in the heater for heating to bending temperature and may be left in the heater until required. The heaters may be arranged in tandem to form heaters of different length.

23 Claims, 1 Drawing Sheet

PLASTIC PIPE HEATER

This invention relates generally as indicated to a plastic pipe or conduit heater, and more particularly to a low cost, easily manufactured electric heater for the field bending of plastic pipe.

BACKGROUND OF THE INVENTION

In the construction industry, plastic pipe or conduit is becoming increasingly employed for a wide variety of uses such as water or sewer lines, or electrical conduit. In order to install such pipe or conduit in the field it has to be bent, and in order to bend plastic pipe or conduit, such as PVC, it has to be heated to a softening temperature. For proper bending the temperature cannot be too hot and it cannot be too cold. Moreover the temperature should be uniform over the axial length of the segment to be bent.

If the temperature is too hot the pipe or segment cannot be properly handled to be field formed in a jig such as shown in prior U.S. Pat. Nos. 4,156,588 and 4,255,378. Also if the pipe or conduit is too cold or not uniformly heated poor quality bends result.

One form of pipe or conduit heater utilizing resistance elements is sold under the trademark HOTBOX ® by Thermotools Company of Cleveland, Ohio. The heater includes a housing with heating elements along one side. A cover may be opened to position the tube or pipe in the housing on rollers. When the cover is closed the pipe or conduit is rotated, either with a power drive or by hand to provide even heating. This form of heater is rather bulky and the larger models even require wheels.

Another form of heater also sold under the trademark HOTBOX ® by Thermotools of Cleveland, Ohio is that shown in U.S. Pat. No. 3,843,858. This model of heater uses a relatively heavy walled metal pipe which is heated by induction through the use of external windings. The heavy walled pipe acts as a heat sink to obtain a substantially uniform heat range throughout its length. In the commercial form the windings are enclosed by insulation in a tubular housing. The ends of the pipe, being exposed, are more difficult to heat and the temperature tends to drop more at the pipe ends. This metal pipe form of heater has the advantage that the plastic pipe or conduit does not have to be rotated, and, depending on the size, several sections of conduit may be heated simultaneously and left in the heater until required.

This type of heater, while quite effective, is also relatively heavy not only because of the heavy walled metal pipe but also the rather large number of windings of copper wire required. More importantly the heater is difficult and expensive to manufacture because of the care which must be taken with the induction heating copper windings.

It would therefore be desirable to have a heater of the heat sink pipe type which would be of lighter weight, and be more easily fabricated at lower cost.

SUMMARY OF THE INVENTION

A plastic conduit heater for use in the field bending of plastic conduit comprises a heat sink pipe segment open at both ends with a resistance heating element wrapped around the exterior of the pipe segment and in intimate contact with the exterior of the pipe segment. The element may be prefabricated and is wrapped in spiral turns which may be more closely spaced toward the ends of the pipe so that the pipe segment is heated uniformly throughout its length. The heating element is encased in insulation which is in turn enclosed in a tubular housing. The housing includes a centrally located handle and an adjustable thermostat for varying the temperature depending on field conditions. One or more plastic conduits or pipes may be positioned in the heater for heating to bending temperature and may be left in the heater until required. The heaters may be arranged in tandem to form heaters of different length.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
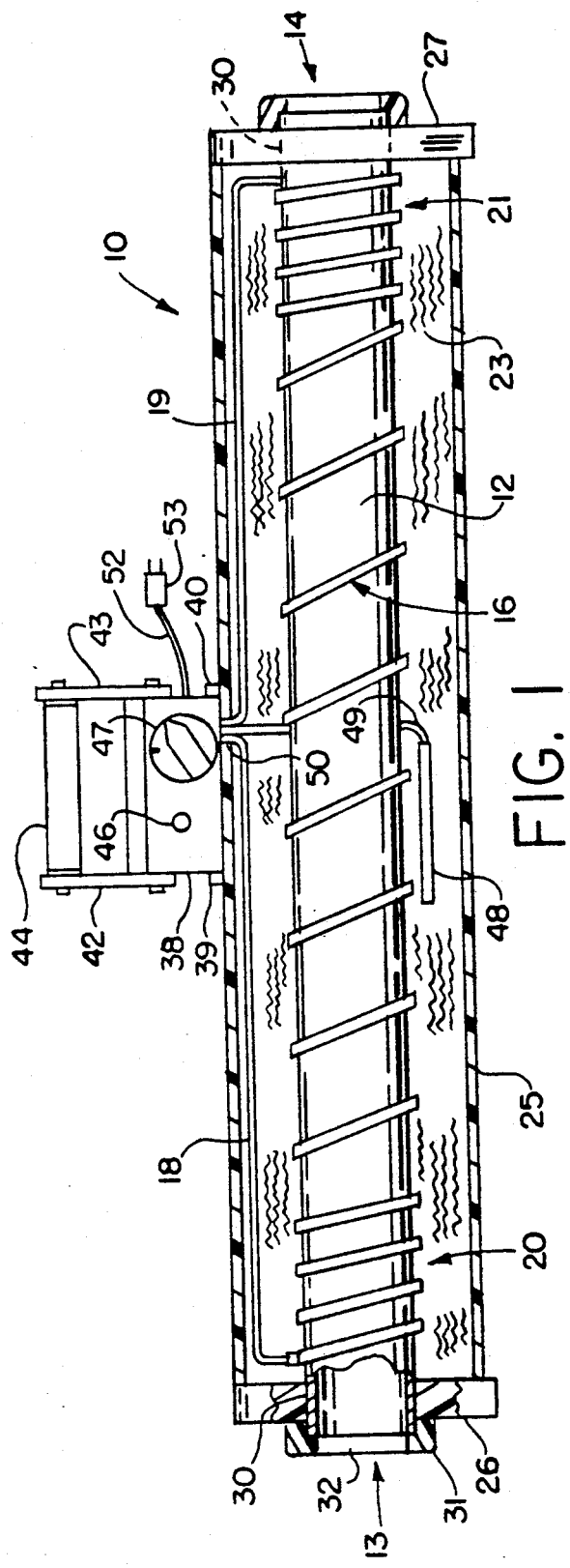
FIG. 1 is a side elevation of the heater of the present invention partially broken away and in section.
Figure 2:
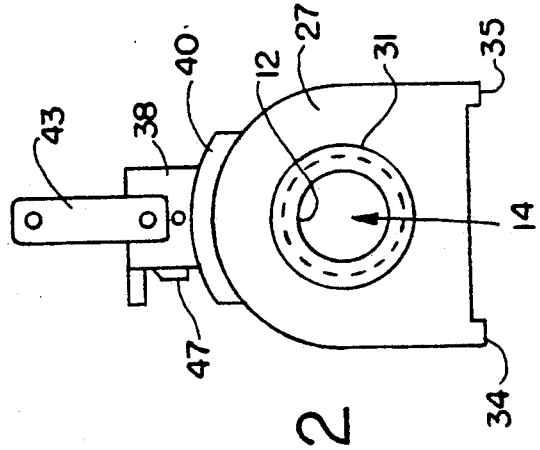
FIG. 2 is an end elevation of the heater.

Referring first to FIGS. 1 and 2 there is illustrated a plastic pipe or conduit heater shown generally at 10 in accordance with the present invention. The heater comprises a length or segment of a heat sink pipe 12 which is open at both ends 13 and 14. The term heat sink refers to a material which tends to hold the heat once heated. The material of the pipe segment may be metal such as steel, or lighter weight metals such as aluminum or alloys. Also some types of plastic or ceramic materials may be employed. Surrounding the pipe 12 is a resistance heating element 16. The heating element is continuous and is wrapped tightly around the exterior of the pipe in the spiral turns shown. The heating element extends from one end of the pipe to the other with the opposite ends of the continuous resistance heating element being connected through leads 18 and 19 to a suitable power source as hereinafter described.

Because of the heat loss through the open ends 13 and 14 of the pipe, the spiral turns of the continuous resistance heating element may be spaced more closely together at the ends of the pipe as seen at 20 and 21. The closer spacing of the spiral turns of the heating element compensates for such heat loss and provides substantially uniform heating of the pipe segment throughout its axial length.

Surrounding the pipe segment and the spirally wrapped resistance heating element in contact with the exterior of such pipe is insulation material shown at 23 which may be in the form of fiberglass. Surrounding the fiberglass is a tubular housing 25 such as plastic tubing which extends between end walls 26 and 27. The end walls may be made of a heat resistant reinforced material such as laminated fiberglass and each end wall includes a circular hole as seen at 30 receiving an end of the pipe. The end of the pipe may project slightly beyond one or both end walls of the housing and a high temperature removable plastic cap as seen at 31 may be provided, such cap including a shoulder fitting over the end of the pipe and having a central hole 32 which is of the same I.D. as the pipe. The cap not only serves to protect the heated end of the pipe from contact but also serves to prevent excessive heat loss through the otherwise exposed end.

Alternatively, the heat sink pipe may project from one end only with the opposite end being somewhat recessed so that if two units are used in tandem, the projecting end of one is simply telescoped into the recessed end of the other. In this form an end cap need not be employed.

As seen more clearly in FIG. 2 the end walls 26 and 27 have a somewhat D-shape with legs 34 and 35 at the ends of the lower straight edge so that the housing may be positioned on a surface or floor and be supported stably.

Diametrically opposite the feet and in the center of the housing 25 there is provided a panel or junction box 38 secured between two circular brackets 39 and 40 directly on top of the housing 25. At each axial end of the housing there is provided a pivoting link as seen at 42 and 43 and extending between the outer ends of such links is a roller type handle 44. The handle is shown in its elevated position so that a user may carry the heater much as one would carry a suitcase.

The panel box 38 may include a pilot light 46 and a thermostat 47, the latter being connected to a temperature sensor indicated at 48. The lead for the temperature sensor seen at 49 enters the panel box through hole 50 in the housing 25 as do the leads 18 and 19 for the continuous resistance heating element. Power for the heating unit may be obtained from the cord 52 and plug 53 through a suitable extension cord at the construction site. The pilot light simply indicates that the unit is on and the thermostat enables the user to raise or lower the temperature range of the heater depending upon working or weather conditions.

Figure 3:
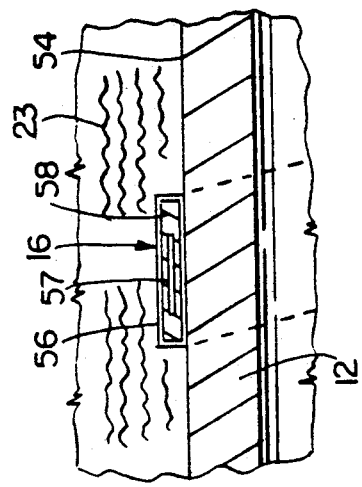
FIG. 3 is an enlarged fragmentary axial section of the heat sink pipe showing one form of heating element in transverse section.

Referring now to FIG. 3 there is illustrated a flattened form heating element 16 in intimate contact with the exterior 54 of the pipe 12. It will be appreciated that a wide variety of heating elements may be employed. A typical such heating element employs an outer sheath or tube of INCOLOX or stainless steel indicated at 56 and a core 57 which may for example be a coiled nichrome (nickel/chromium alloy) wire. Between the core wire and the sheath there is provided electrical insulating material such as compacted magnesium oxide as seen at 58. In any event the heating element is wrapped around the exterior of the pipe and is in intimate direct contact with such pipe. It will be appreciated that other types of flattened resistance heating elements such as flexible tapes or braids may equally well be employed.

Figure 4:
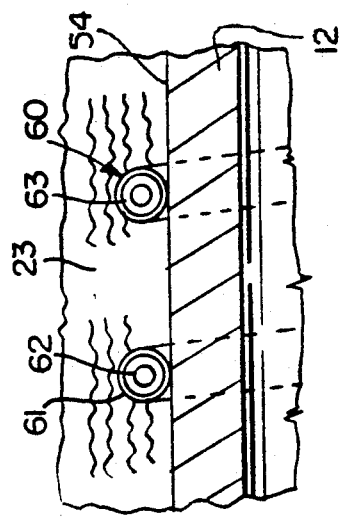
FIG. 4 is a similar section showing another form of heating element.

In FIG. 4 there is illustrated an embodiment of the invention which utilizes a circular in section resistance heating element 60 which employs an outer sheating of incoloy or stainless steel 61, a coiled core wire 62 of nichrome and surrounded by a high temperature insulation material 63 such as compacted magnesium oxide. The resistance heating element is tightly coiled against the exterior 54 of the pipe and is surrounded by insulation 23.

In manufacture, the continuous heating element may be prefabricated to the spiral turn shape illustrated and simply slipped over the exterior of the pipe 12. The prefabricated heating element may then be axially stretched and this then causes the heating element to grip the exterior of the pipe as a Chinese finger grip. The insulation 23 may then be applied and the tubular housing placed over the assembly. Because of the ability to control the turns of the resistance heater and the spacing of the turns uniform heat axially of the pipe segment is provided avoiding striping or hot spots and also compensating for heat loss at the ends of the pipe segment. With the ability to control the spacing of the turns along the length or segment of pipe, which acts as a heat sink, it is possible to provide a thinner wall pipe thus providing a lighter weight heater. Most of the weight of the unit is of course in the pipe.

The length and diameter dimensions of the heater may vary and a typical length dimension would be 28 inches with an I.D. of the pipe of 2 inches. Such a heater would then accommodate up to five ½" plastic conduit lengths, up to three ¾" conduit lengths, one 1" or one 2" plastic conduit or pipe length. Larger diameters may be provided for larger plastic pipe. In order to increase the length, it will be appreciated that two heaters may be employed in tandem simply by placing the heaters end-to-end.

It can now be seen that there is provided a plastic pipe or conduit heater of the pipe type which may be lighter weight, provide axial uniformity of heat, and be more easily fabricated at lower cost.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A plastic pipe or conduit heater comprising a heat sink pipe segment open at both ends, a resistance heating element surrounding said pipe segment in tight juxtaposition to the exterior of said pipe segment, heat insulation surrounding said heating element, and a housing surrounding said insulation; said housing including two end walls and one end of said pipe segment projecting slightly beyond one of said end walls with the other end of said pipe segment being slightly recessed within the other of said end walls to facilitate operating a plurality of such heaters in tandem.

2. A heater as set forth in claim 1 wherein said resistance heating element is spiral wrapped around the exterior of said pipe segment.

3. A heater as set forth in claim 2 wherein the turns of the spiral wrapped heating element are spaced axially a greater extent at the center of the pipe segment.

4. A heater as set forth in claim 2 wherein the turns of the spiral wrapped heating element are more closely axially spaced at the ends of the pipe segment.

5. A heater as set forth in claim 1 wherein said resistance heating element is generally flattened to present a flat surface to the exterior of said pipe segment.

6. A heater as set forth in claim 1 wherein said resistance heating element is circular in section.

7. A heater as set forth in claim 1 wherein said heat sink pipe segment is metal.

8. A heater as set forth in claim 1 wherein said pipe segment is circular in section.

9. A plastic pipe or conduit heater comprising a heat sink pipe segment open at both ends, a resistance heating element surrounding said pipe segment in tight juxtaposition to the exterior of said pipe segment, heat insulation surrounding said heating element, and a tubular housing surrounding said insulation and extending between ends walls at each end of said pipe segment; wherein said end walls are provided with feet to keep said housing stable and above a floor; and wherein said heater includes a handle mounted on top of a panel box extending from said tubular housing in the center thereof and diametrically opposite the feet, said panel box including a thermostat for varying the temperature in said pipe segment.

10. A heater as set forth in claim 9 wherein said pipe segment is circular in section and said tubular housing is circular in section, and wherein said pipe section is positioned substantially coaxial with said housing.

11. A heater as set forth in claim 9 wherein said end walls are D-shape and have a lower straight edge and wherein said feet extend downwardly from said straight edge.

12. A heater as set forth in claim 9 including a handle on said tubular housing in the center thereof and diametrically opposite the feet.

13. A plastic pipe or conduit heater comprising a heat sink pipe open at both ends; a continuous resistance heating element extending spirally around the outside of said pipe in close juxtaposition to the exterior of said pipe, the area of contact between said heating element and said pipe being greater towards the ends of the pipe; and a housing surrounding said pipe and including two end walls; said pipe segment projecting slightly beyond one of said end walls and being recessed slightly within the other of said end walls.

14. A heater as set forth in claim 13 wherein said heat sink pipe is metal.

15. A heater as set forth in claim 14 wherein the turns of the spiral wrapped heating element are spaced axially a greater extent at the center of the metal pipe.

16. A heater as set forth in claim 14 wherein the turns of the spiral wrapped heating element are more closely axially spaced at the ends of the metal pipe.

17. A heater as set forth in claim 13 wherein said resistance heating element is generally flattened to present a flat surface to the exterior of said heat sink pipe.

18. A heater as set forth in claim 13 wherein said resistance heating element is circular in section.

19. A heater as set forth in claim 12 wherein said pipe segment is circular in section.

20. A plastic pipe or conduit heater comprising a heat sink metal pipe open at both ends; a continuous resistance heating element extending spirally around the outside of said pipe in close juxtaposition to the exterior of said pipe, the area of contact between said heating element and said pipe being greater towards the ends of the pipe; insulation surrounding said heating element; and a tubular housing surrounding said insulation and extending between end walls at each end of said metal pipe, wherein said end walls are provided with feet to keep said housing stable and above a floor; and wherein said heater further includes a handle mounted on top of a panel box extending from the center of said tubular housing and located diametrically opposite such feet, said panel box including a thermostat for varying the temperature in said heat sink pipe.

21. A heater as set forth in claim 20 wherein said pipe segment is circular in section and said tubular housing is circular in section, and said pipe section is positioned substantially coaxial with said housing.

22. A heater as set forth in claim 20 wherein said end walls are D-shape and have a lower straight edge and said feet extend downwardly from said straight edge.

23. A heater as set forth in claim 20 including a handle on said tubular housing in the center thereof and diametrically opposite the feet.

* * * * *